(12) United States Patent
Korchemny et al.

(10) Patent No.: US 11,501,050 B1
(45) Date of Patent: Nov. 15, 2022

(54) ANALOG MIXED-SIGNAL ASSERTION-BASED CHECKER SYSTEM

(71) Applicant: Synopsys, Inc., Mountain View, CA (US)

(72) Inventors: Dmitry Korchemny, Kfar Saba (IL); Eduard R. Cerny, Jupiter, FL (US); Ilya Kudryavtsev, Zichron Yaakov (IL)

(73) Assignee: Synopsys, Inc., Mountain View, CA (US)

( * ) Notice: Subject to any disclaimer, the term of this patent is extended or adjusted under 35 U.S.C. 154(b) by 16 days.

(21) Appl. No.: 17/176,993

(22) Filed: Feb. 16, 2021

Related U.S. Application Data

(60) Provisional application No. 62/978,215, filed on Feb. 18, 2020.

(51) Int. Cl.
*G06F 119/02* (2020.01)
*G06F 30/367* (2020.01)
*G06F 30/38* (2020.01)

(52) U.S. Cl.
CPC .......... *G06F 30/367* (2020.01); *G06F 30/38* (2020.01); *G06F 2119/02* (2020.01)

(58) Field of Classification Search
USPC ........................................................ 716/100
See application file for complete search history.

(56) References Cited

U.S. PATENT DOCUMENTS 9,501,592 B1 * 11/2016 Kolpekwar ........... G06F 30/367

OTHER PUBLICATIONS

Accellera, "Verilog-AMS Language Reference Manual," May 30, 2014, 437 pages, Version 2.4.0.
Ain, A. et al., "Monitoring AMS Simulation: From Assertions to Features," IEEE, 2015 28th International Conference on VLSI Design, Jan. 3, 2015-Jan. 7, 2015, pp. 429-434.
Cadence Design Systems, Inc., "Cadence® Verilog®—A Language Reference," Dec. 2006, 530 pages, Product Version 6.1.
Ferrère, T., "Assertions and Measurements for Mixed-Signal Simulation (PhD Thesis)," Grenoble University, Oct. 28, 2016, 124 pages.
Havlicek, J. et al., "Realtime Regular Expressions for Analog and Mixed-Signal Assertions," Proceedings of the 11th Conference on Formal Methods in Computer Aided Design (FMCAD 2011), Oct. 30, 2011-Nov. 2, 2011, pp. 155-162.
Little, S., "Using Assertions in AMS Verification", Freescale Semiconductor, Dec. 6, 2010, 24 pages.
NumPy, "The fundamental package for scientific computing with Python," undated, four pages, [Online] [Retrieved on Apr. 13, 2021], Retrieved from the Internet<URL: https://numpy.org/>.

(Continued)

*Primary Examiner* — Bryce M Aisaka
(74) *Attorney, Agent, or Firm* — Fenwick & West LLP

(57) ABSTRACT

A design for an analog mixed-signal (AMS) circuit is accessed. An assertion for verifying the behavior of an analog signal in the AMS circuit is also accessed. The assertion is expressed in an assertion language for AMS circuits. A processor verifies the assertion against the predicted behavior of the analog signal in the AMS circuit. In various embodiments, the assertion language contains predefined classes for assertions in the temporal domain, for assertions in the frequency domain, and for assertions based on functional dependencies of an output analog signal on an input analog signal.

20 Claims, 5 Drawing Sheets

(56) References Cited

OTHER PUBLICATIONS

O'Riordan, D. et al., "PSL/SVA Assertions in SPICE," In Proceedings of the Design and Verification Conference and Exhibition, 2012, six pages.
Shi, C.-J. R., Mixed-Signal System-on-Chip Verification Using a Recursively-Verifying-Modeling (RVM) Methodology, IEEE, Proceedings of 2010 IEEE International Symposium on Circuits and Systems, May 30, 2010-Jun. 2, 2010, pp. 1432-1435.
Synopsys Inc., "Custom Wave View™ ACE Command Reference," Jun. 2019, 248 pages, Version P-2019.06.
The MathWorks, Inc., "MATLAB," undated, five pages, [Online] [Retrieved on Apr. 13, 2021], Retrieved from the Internet<URL: hitps://www.mathworks.com/products/matlab.html>.
Ulus, D. et al., "Integrating Circuit Analyses for Assertion-based Verification of Programmable AMS Circuits," IEEE, Proceedings of the 2013 Forum on specification and Design Languages (FPL), Sep. 24, 2013-Sep. 26, 2013, eight pages.

* cited by examiner

Vout(Vdd,T):

| Vdd | T | | | | |
|---|---|---|---|---|---|
| | -20 | 0 | 20 | ... | 100 |
| 0.500 | 0.479 | 0.478 | 0.478 | | 0.454 |
| 0.525 | 0.477 | 0.476 | 0.476 | | 0.452 |
| 0.500 | 0.477 | 0.476 | 0.475 | | 0.451 |
| ... | | | | | |
| 0.700 | 0.462 | 0.461 | 0.459 | | 0.440 |

Q(Vdd,T):

| Vdd | T | | | | |
|---|---|---|---|---|---|
| | -20 | 0 | 20 | ... | 100 |
| 0.500 | 95 | 93 | 90 | | 78 |
| 0.525 | 94 | 92 | 89 | | 77 |
| 0.500 | 92 | 91 | 87 | | 75 |
| ... | | | | | |
| 0.700 | 77 | 75 | 74 | | 68 |

ANALOG MIXED-SIGNAL ASSERTION-BASED CHECKER SYSTEM

RELATED APPLICATION

This application claims the benefit of U.S. Provisional Application No. 62/978,215, "Analog Mixed-Signal Assertion-Based Checker System," filed Feb. 18, 2020, which is incorporated by reference in its entirety.

GOVERNMENT RIGHTS LEGEND

This invention was made with government support under Agreement No. HR0011-18-9-0008 awarded by The Defense Advanced Research Projects Agency. The government has certain rights in the invention.

TECHNICAL FIELD

The present disclosure relates to electronic design automation in general and more specifically to the verification of analog mixed-signal integrated circuits using assertions.

BACKGROUND

As integrated circuits become more complex, more expensive and with shorter time to market, it is more important to be able to simulate and otherwise analyze integrated circuits before they are released for fabrication. Faster and more thorough analysis of integrated circuits during the design phase reduces the risk of errors in the fabricated die. This can save on costly corrections and reduce the risk of delays in releasing products to market.

Assertion-based checkers are one approach used to verify that digital circuits are operating correctly. The designer writes assertions which describe the proper operation of the digital circuit. Automated tools then read the assertions, read the design of the digital circuit and determine whether the current design's operation matches the behavior specified in the assertion. Property Specification Language (PSL) and SystemVerilog (SVA) are two common languages that support the creation of assertions for digital circuits.

However, many integrated circuit devices include analog circuits and the differences between analog circuits and digital circuits make it difficult to write assertions for analog mixed-signal (AMS) designs using languages designed for digital circuits. Thus, there is a need for better approaches to support assertions for AMS circuits.

SUMMARY

One aspect of the present disclosure includes the following. A design for an analog mixed-signal (AMS) circuit is accessed. An assertion for verifying the behavior of an analog signal in the AMS circuit is also accessed. The assertion is expressed in an assertion language for AMS circuits. For example, the AMS assertion language may support mathematical relations using real and complex numbers, rather than just bit manipulations for digital circuits. A processor verifies the assertion against the predicted behavior of the analog signal in the AMS circuit. In various embodiments, the assertion language contains predefined classes for assertions in the temporal domain, for assertions in the frequency domain, and for assertions based on cross-domain functional dependencies.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
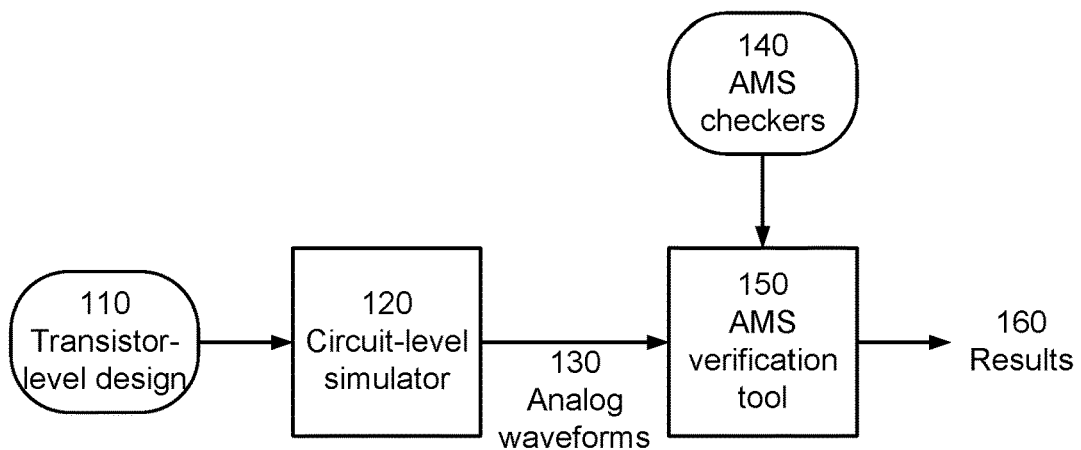
FIG. 1 is a block diagram showing use of an AMS assertion-based system with circuit-level simulations.

Aspects of the present disclosure relate to analog mixed-signal assertion-based checkers. Because of the differences between digital circuits and analog circuits and between digital signals and analog signals, languages that provide a suitable framework for writing assertions for digital circuits typically are not suitable for writing assertions for analog mixed signal (AMS) circuits. For example, in an AMS circuit, it may be necessary to perform measurements in the frequency domain by applying a Fast Fourier Transform (FFT) on a sliding window over the signal trace. This typically is not supported by digital-centric assertion languages since digital-centric languages typically are limited to temporal assertions. As another example, assertions for analog signals may require using real numbers, whereas assertions for digital signals may be limited to bits and bit vectors. In addition, within a digital-centric framework, the validation of signal traces from AMS circuits may require using a user-defined non-standard assertion statement or specialized user-written code to provide the correct time synchronization or to perform measurements and to collect information from signal traces for passing to assertions. Sometimes, the validation may be done visually if no better alternatives are available. As another example, DC analysis as well as some AC analysis for AMS signals may require different types of checks than the transient analysis used for digital signals.

Without an assertion language specifically built for analog mixed-signal (AMS) designs, it is difficult to provide unified reporting for different types of assertions. For example, problems in the frequency domain or in cross-domain checks may be reported ad hoc. This is also the situation for temporal checks implemented directly in MATLAB or similar frameworks. The lack of a robust framework for AMS assertions and the resulting lack of unified reporting also makes more difficult the integration between different AMS design, debug and visualization tools.

An example of an assertion language designed for AMS circuits is described below. This specific example is a Python-based language and implementation for writing AMS assertion-based checkers, referred to as Amstaff (AMS Tunable Assertions for Fault Free designs). The AMS-centric language is easier to use because it provides features that a designer naturally employs to analyze the behavior of analog signals in an AMS circuit, rather than requiring the designer to write code that translates the behavior of analog signals into a framework tailored for digital signals. The Amstaff language hides many low-level tasks and supports temporal, frequency domain and functional dependency assertions. It should be understood that other implementations will be apparent. For example, the bulk of the Python language formulation can be translated to SystemVerilog classes supported by a specialized package.

Features and benefits of various embodiments may include any of the following:
- Expressiveness. Amstaff provides broad support for expressing almost everything that is required for AMS checks, e.g., checking waveforms, spectra, cross-domain dependencies, transfer functions and system stability. In the Python implementation, besides the language itself, the user also has access to NumPy libraries for array and matrix manipulation and to SciPy libraries for mathematical, scientific and engineering functions.
- Ease of use. This includes access to extensive libraries, the ability to treat signals and spectra as arrays so that array manipulations may be used, seamless integration of Fourier transform and iteration over functional dependencies, and the ability to implicitly exclude from consideration areas of traces and spectra.
- An analog signal is represented by its sampled trace of values at equidistant temporal points. If samples generated by the source simulation/emulation are not equidistant, they are resampled to a common time base. The time base is thus the same for all signal traces accessed by the checker.
- Checkers include assertions and user-defined functions.
- Assertions in both the temporal domain and frequency domain are supported. Functional dependency assertions across domains are supported.
- Assertion invocation and function execution is implicit. Functional dependency assertions are invoked explicitly by the user.
- A library of functions is provided to support assertions at higher levels of abstraction and to carry out measurements over various signals. Results can be checked by assertions or displayed.
- The user need not be concerned with processing individual samples. Analog signals are represented as arrays and operations are at the array level.
- A specification includes one or more checkers, each checker has one or more assertions.
- Reports of failures of temporal assertions identify the relevant time intervals.
- Reports of failures of frequency domain assertions identify the relevant time window and the relevant frequency harmonics or frequency intervals.
- Reports of failures of functional dependency assertions identify the relevant ranges in the input parameter space.

Part 1. AMS Assertion-Based System
Introduction

Figure 2:
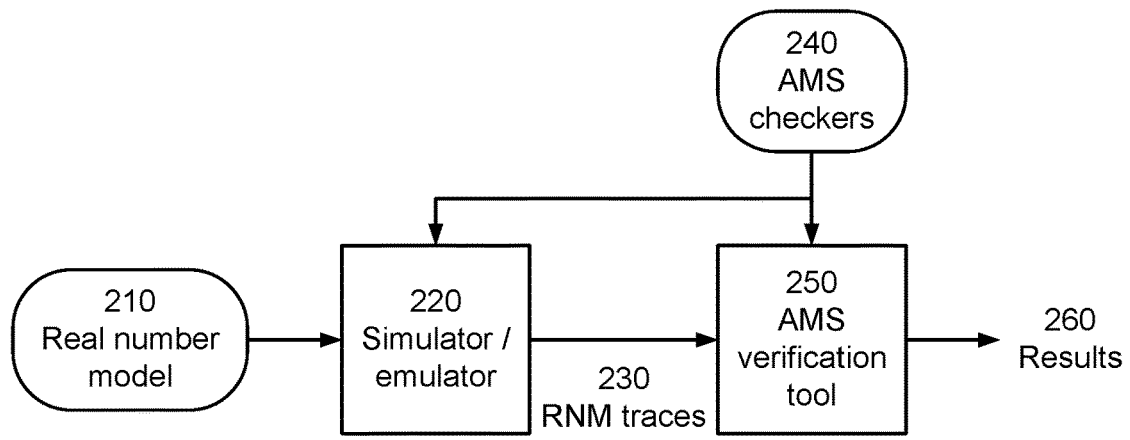
FIG. 2 is a block diagram showing use of an AMS assertion-based system with system-level mixed signal real number model (RNM) simulations and emulations.
Figure 3:
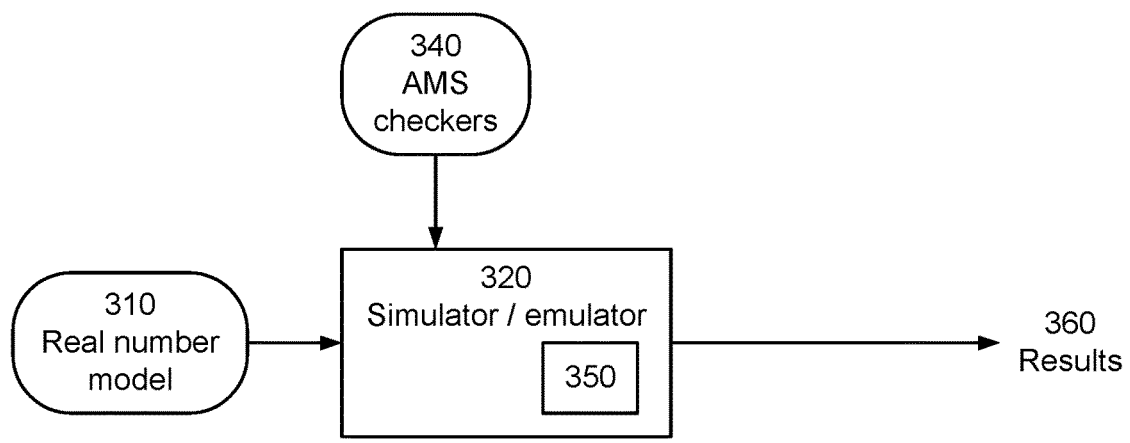
FIG. 3 is a block diagram showing an alternate embodiment for analyzing RNM models.

Amstaff provides a specification language and its implementation system for describing the functionality of analog signals in AMS designs, including in both fully analog designs and also in mixed signal designs (e.g., the interaction between analog and digital signals). The specification for the AMS design describes what the designed block does, but not how it does it. In this example, signal traces are processed as arrays (e.g., Python NumPy), which allows the use of array operations and functions. This supports off-line checking using trace files for the signals of interest. However, it may also be run in an online mode in simulation or emulation. FIGS. 1-3 show some use scenarios for the AMS assertion-based system.

FIG. 1 is a block diagram showing use of an AMS assertion-based system with circuit-level simulations. In this example, the design of interest is analyzed at the transistor level and is modeled by a network 110 of interconnected transistors and other elements (such as diodes, resistors and capacitors). The transistor-level network 110 is simulated by a circuit-level simulator 120, such as SPICE. This produces a set of waveforms 130, also known as signal traces, of analog signals at various points in the circuit. Checkers 140 describe the desired behavior of these analog waveforms. The checkers may include AMS assertions and user-defined functions, as described in more detail below. An AMS verification tool 150 receives both the checkers 140 and the signal traces 130 and determines whether the waveforms 130 comply with the checkers 140. The results 160 are output.

The results 160 may be reported to the user so that the user may take appropriate action. Alternatively, the results 160 may be captured in a format, such as a database or file, that is then used by another tool. In yet another alternative, the results 160 may automatically trigger actions, such as to modify the transistor-level design 110 to address any reported failures.

FIG. 2 is a block diagram showing use of an AMS assertion-based system with system-level mixed signal real number model (RNM) simulations and emulations. In this example, the analog design of interest is represented by an RNM model 210. In a real number model, the behavior of the circuit is evaluated using real number values, rather than deriving the behavior by solving differential equations based on physics first principles. For example, an RNM model of an analog amplifier may be given by: assign y=100.0*x, where x is the input to the amplifier and y is the output of the amplifier. The RNM model 210 is analyzed by a simulator or emulator 220, producing traces 230 of various analog variables in the RNM. In this example, the traces 230 produced by the simulator/emulator 220 are determined by which checkers 240 are active. Checkers 240 describe the desired behavior of these RNM traces 230. An AMS verification tool 250 receives both the checkers 240 and the signal traces 230 and determines whether the signal traces comply with the checkers 240, outputting the result 260.

FIG. 3 is a block diagram showing an alternate embodiment for analyzing RNM models. In FIGS. 1 and 2, the simulator 120/220 first runs and outputs analog waveforms 130/230 which are then post-processed by the AMS verification tool 150/250 using checkers 140/240. The verification occurs after the simulation 120/220 has ended. In the example of FIG. 3, the AMS verification 350 occurs in parallel with the simulation 320. In one approach, the verification tool 350 and the simulation tool 320 are two separate tools that run in parallel. The verification tool 350 analyzes the signal traces produced by simulation 320 as the simulation progresses. In an alternate approach, the verification function 350 may be integrated with the simulation 320.

Some of the principles of an AMS-centric system are illustrated using a simple example. Assume the design of interest is an analog amplifier with input x and output y. Besides y, the analog circuit also generates a signal sig having a sine waveform.

We wish to write two assertions that capture the following behaviors:

1. Signal sig has a sine waveform: sig=10 sin(20 t+π/4).
2. Signal y is an amplified version of x with a minimum gain of 100, so that: y>100 x.

These statements require several clarifications:

It is meaningless to check two real numbers for exact equality. Therefore, in the first assertion an absolute or relative tolerance is provided.

A real amplifier introduces delay. Therefore, the second assertion is likely to fail if this delay is not considered. A better solution is to check this assertion in the frequency domain: the amplification factor is at least 100 for the frequency components within the bandwidth of the amplifier.

A checker with these two assertions is derived from a class ams_checker. The software that creates the checker also establishes the link with the signal traces for x and y and various parameters and checking criteria. In this example, assertions are derived from several classes depending on the domain of the signals: assert_temporal for temporal assertions, assert_window for frequency domain assertions, and assert_func for cross-domain assertions (not used in this small example). The following is the resulting checker.

```
from numpy import*
from amscheck import*# classes and functions specific to
    Amstaff
@ams_checker # decorator for Amstaff checker; also
    enables syntax of a data class
class ToyChecker: # toy checker
    # Input data
    sig: signal
    x: signal
    y: signal
    gain: real
    bandwidth: real=1000
    rtol: real=1e-05 # relative tolerance
    atol: real=1e-08 # absolute tolerance
    # Post-initialization
    def _post_init_(self):
        self.X=self.make_spectrum(self.x) # convert from
            time to frequency spectra
        self.Y=self.make_spectrum(self.y)
        self.set_option(frequency_ub=self.bandwidth)
    @assert_temporal # temporal assertion decorator
    def CheckWaveform(self): # assertion 1 above
        return isclose(self.sig,10*sin(20*_t+pi/4), rtol= self.rtol, atol=self.atol)
    @assert_window # frequency assertion decorator
    def CheckFrequencies(self): # assertion 2 above
        return abs(self.X)*self.gain<=abs(self.Y)
# read analog trace signals and assign to corresponding
    arrays sig, x, y=get_signals('sig', 'x', 'y')
# Instantiate checker
checker=ToyChecker(x, y, sig, gain=100, bandwidth=1*
    units. GHz)
# run
checker. check ( )
```

Checker Evaluation Flow

Figure 4:
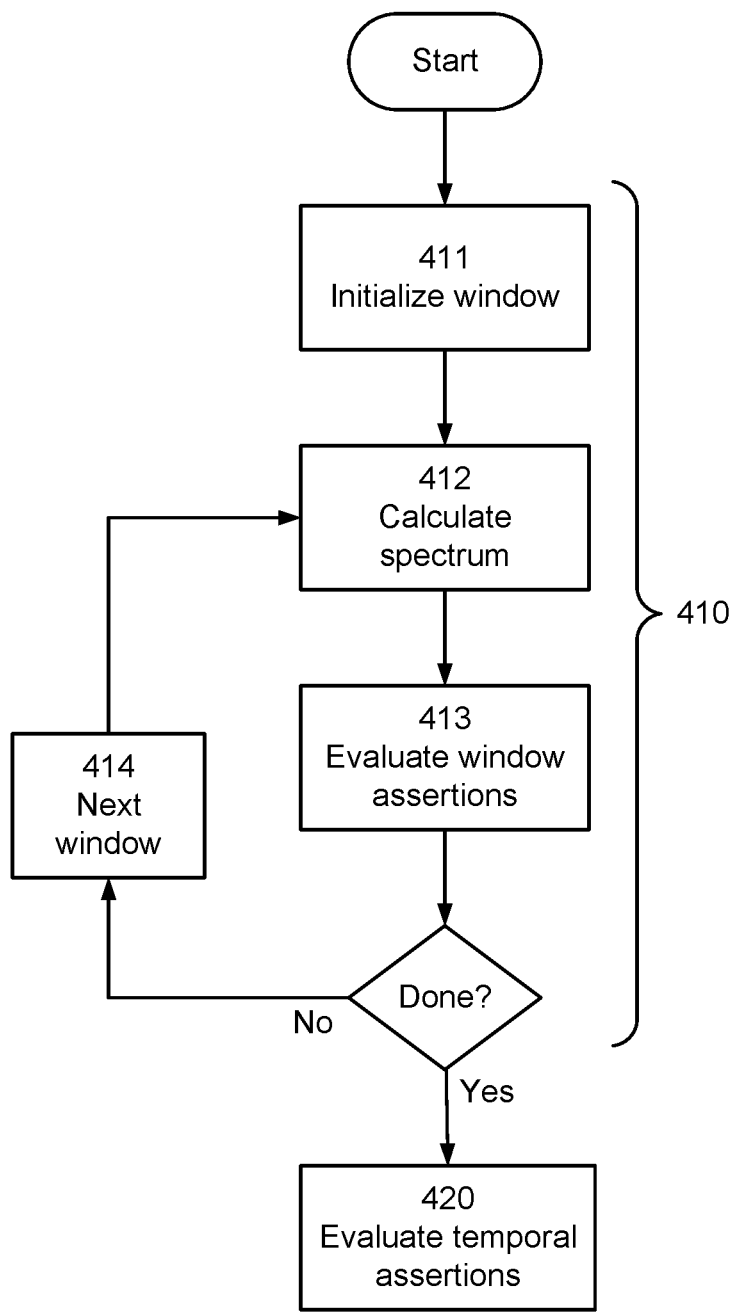
FIG. 4 depicts a flowchart for running checkers in an AMS assertion-based system.

When the checker function check( ) is invoked, the evaluation of the various functions and assertions in the checker body are carried out according to the flowchart of FIG. 4. The frequency domains assertions (and other window-based assertions) are evaluated 410 first, and then the temporal assertions are evaluated 420. The functional dependency assertions are evaluated by explicit calls in the checker code. Evaluating the frequency domains assertions uses a sliding window. The window is initialized 411. The spectra for that window position are calculated 412, for example using the FFT. The frequency domain assertions are evaluated 413 for that window position. The window is moved 414 to the next position and the process is repeated.

Checker Definition and Instantiation

The following sections describe the main classes and functions that form the expressive environment of Amstaff for assertions. Amstaff checker is a Python class decorated with @ams_checker. The decorator makes the checker class known to Amstaff and it adds to it more data and function members than provided by the user. It also enables the syntax of Python data class. Checker data declaration and trivial initialization is written at the beginning of the class. More complex initialization is implemented in function _post_init__( ). For example, in the ToyChecker above, data declaration and initialization is

```
sig: signal
x:signal
y:signal
gain: real
bandwidth: real=1000
rtol real=1e-05
atol real=1e-08
def _post_init_(self):
    self.X=self.make_spectrum(self.x) # builds spectra
    self.Y=self.make_spectrum(self.y)
    self.set_option(frequency_ub=self.bandwidth)
```

Handling of sig, gain, and the tolerances rtol and atol is self-explanatory. Input signals x and y are converted into spectra X and Y in the frequency domain which can be accessed in functions and assertions. Amstaff evaluates spectra using a sliding window concept as explained in the section on frequency domain assertions. Objects of class spectrum can be accessed as arrays of frequency bins.

Parameter bandwidth is stored as a checker option, self-.set_option(frequency_ub=self.bandwidth). Checker options are a data structure ams_checker_options associated with the checker object. Option frequency_ub sets the upper limit of a frequency to be used in frequency assertions.

Assertions in Temporal Domain

Temporal assertions are checker methods decorated with @assert_temporal. They describe analog signal behavior in time. Signals are considered arrays whose entries correspond to the sampling clock ticks. Assertions in the temporal domain usually belong to one of the following classes:

Relations between temporal signals.

Dependency of signals on time, i.e., waveform definition.

Relations between values collected on sliding window moves, such as signal amplitude and frequency.

Integral characteristics, such as root mean square (RMS).

When the entire checker consists of a single temporal assertion, Amstaff allows a simplified syntax, instead of writing and instantiating the checker class. For example, al: assert_t(isclose(sig, 10*sin(2*pi*_t/64+pi/4), rtol=0.001, atol=0.05))

Assertions in Frequency Domain

Figures 5, 6:
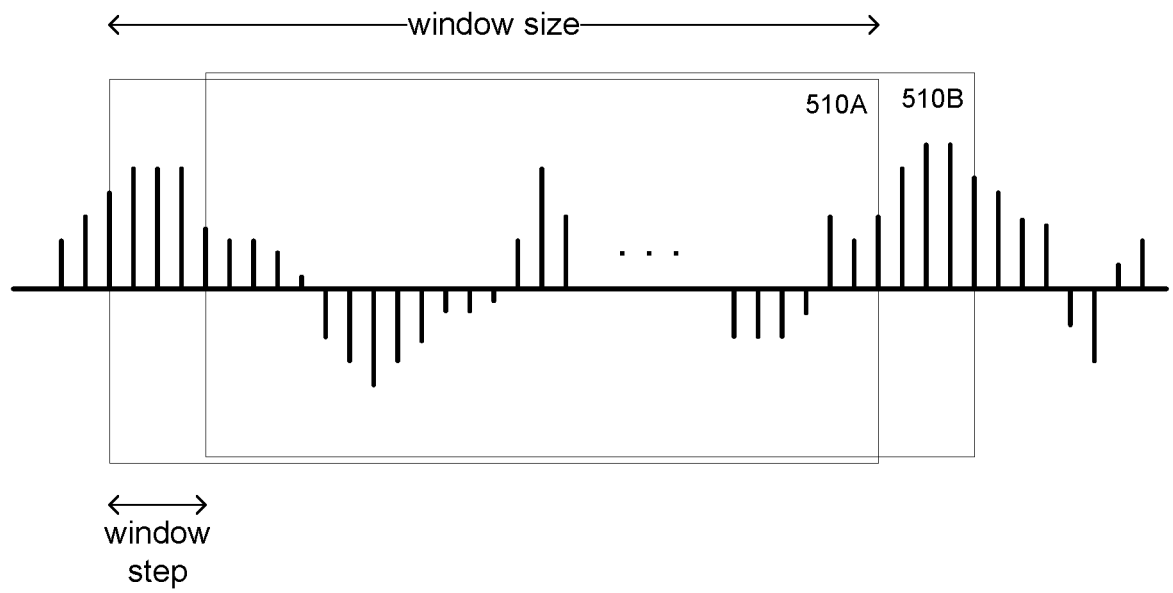
FIG. 5 depicts parameters for a sliding window.
FIG. 6 depicts functional dependencies defined by tables.

Frequency domain assertions are checker methods decorated with @assert_window, because they are based on a sliding window. Signal analysis in the frequency domain has many advantages. It allows to estimate the average signal behavior, its main frequency, periodicity, to conduct noise analysis, to understand signal distortions, etc. Frequency domain assertions may rely on short-time Fourier transform implemented as a Fast Fourier Transform (FFT). The transform is based on a fixed size window, sliding along the signal. For each position of the sliding window a frequency spectrum is computed. The sliding window has the following characteristics, as shown in FIG. 5. FIG. 5 shows two consecutive windows 510A and 510B:

Window size in time steps. The default is 1024.
Window step—the number of time steps the window is advanced when it slides to the next position.
Window function—function applied to sampled signal values before computing Fourier transform. Known window functions such as rectangular, Hann, Blackman, Hamming, etc., are supported.

Assertions with Functional Dependency; Cross-Domain Assertions

Functional dependency assertions are decorated with @assert_func. For example, SPICE can perform DC and AC analyses, temperature sweep, etc. These non-transient analyses have the following in common. There are independent quantities which are swept over a range of values, and dependent quantities which are computed for each value as a combination of the input quantities. The independent and dependent quantities are not all simulated during the same simulation run. In Amstaff, a functional dependency uses two variable sets: input variables, also called axes, and output variables.

For example, consider a sensor that generates an output voltage Vout and a periodic signal with period Q as a function of the Vdd voltage and temperature T. The corresponding functional dependency has two input variables, Vdd and T, and two output variables, Vout and Q. Furthermore, the temperature T and voltage Vdd are held constant for any particular simulation run; they change only from run to run. Assuming that Vdd changes from 0.5 V to 0.7 V with the step 0.025 V and T changes from −20 to 100 with step 2 of 20° C., it is possible to represent the functions Vout and Q as matrices with different values of Vdd and T as rows and columns, as shown in FIG. 6.

Measurements

Amstaff makes it possible to accumulate data during the checking run and use the data at the end of the run. The so accumulated data are called measurements. The measurements are any data members of the checker class, i.e., declared in the body of the checker definition. Measurements can be used to compute the average value of a signal over the entire trace, the signal-to-noise ratio, etc., and then report the results after the checker finished execution. For example, @ams_checker
class MyChecker:class MyChecker:
  sig: signal
  # . . .
  def _post_init_(self):
    # . . .
    self.mean_val=mean(self.sig)
  # assertions (not shown)
    . . .
ck=MyChecker (my_signal)
ck. check ( )
print (f'Average value={ck.mean_val}, rms={ck.rms}')

The data member mean_val is declared in the checker body and it computes the average value of sig over the trace. After the checker finishes execution, the average value is output.

It is often convenient to define a separate class for all measurements and populate an object of this class during checker execution. Thereafter, this measurement object may be saved (pickled) to be restored (unpickled) in a different executable.

Testbench

In Amstaff, it is possible to generate signal waveforms programmatically, including pseudo-random number generators. This feature is convenient for debugging checkers and carrying out a what-if analysis by modifying signal traces from a simulation.

Reporting Assertion Failures

At the end of a run, Amstaff displays the list of assertions with a passed/failed indication. It may provide the following information.

For a temporal assertion—its failure intervals.
For a window assertion—its failure time intervals and for each failure point the offending frequency or frequency intervals.
For functional assertions—the ranges in the input variable space where the assertion fails. For example, it reports that the input voltage is in the interval between 0V and 0.5V and the temperature is in the interval between −10° C. and 20° C.

To debug failing assertions, Amstaff can be run in the GUI mode in which case for each failed assertion signal values can be inspected. Amstaff highlights time intervals where the assertion failures were detected. For window assertions, it is also possible to inspect signal spectra at the time instances of an assertion failure.

Part 2. Amstaff Environment

The following sections describe the elements that support the functionality described above. The Amstaff environment is encapsulated in the amscheck package. Consequently, unless required to disambiguate the reference to its component, in what follows the package name is not explicitly mentioned.

Enumerations class ClockDef(enum.Enum) defines built in clock types as fastest and window. All other clocks are specified explicitly. Fastest clock corresponds to the signal trace granularity. It ticks at each time step. Normally, it is the default clock. It can be explicitly specified as amscheck.ClockDef.fastest. Window clock ticks at each move of the sliding window. This clock may be different for different checkers or checker instances. It can be specified as amscheck.ClockDef.window. Other clocks are represented as arrays that can be interpreted as Boolean arrays having the same dimension as the signal trace array. The signal or a waveform is sampled at the positions where the Boolean value is True. In practice, there is often a need to sample signals on the rising edge of the clock. That can be achieved by using posedge=rising(clk).amscheck.rising( ) returns a Boolean array with True at the positions where c/k is low and at the next position it is high.

class WinFunction defines an enumeration-like API for sliding window types, most of known windowing functions are supported.

Amstaff Registry class registry defines features of the Amstaff environment and checker configuration. The attributes of the class include:

- seed for the pseudo-random number generator,
- timestep in time units,
- timescale an array of time values for all time steps (can also be accessed via amscheck package variable t),
- trlen a trace length as the number of time steps,
- units a read-only attribute defining units of various physical quantities. Amstaff stores all signal values dimensionless in terms of base units. Time is in seconds, frequency base unit is Hz, voltage is V and current is A. If a different unit is used in an expression, e.g., 0.5*registry.units.mV, it is converted internally to the base unit, here 0.0005. Signals are associated with physical units. This association is established when a signal is added to Amstaff, e.g., V1=registry.add_signal('V1', unit=units.V).

Class methods include

- add_signal(name, unit=None) for adding a signal to the registry,
- get_or_create_signal(name, unit=None) get a signal if it exists or create one if not (can also be done using amscheck function get_signals( ),
- get_signal(name) get signal by name,
- set_conditional_trace_data(initial_time, end_time, timestep) set trace data and all trace attributes and timescale are updated.

Signal

Amstaff Signal class combines an analog waveform (an array) and several other characteristics, such as its name and physical units. Signals are stored as arrays. The package variable t is an array storing time value for time steps. Given signals sig1 and sig2, it is possible to write sig1+sig2 to get an array of signal value sums at each time step, or to invoke the function is close(sig1, sig2) to check that sig1 and sig2 are approximately equal.

Usually Amstaff signals correspond to device under test or testbench signals, but they may also be generated in a checker, e.g., to build a spectrum of a waveform or to evaluate its characteristics such as frequency, amplitude or phase. Signals may not be created directly but should be obtained through the registry. Class Signal has the following methods:

- has_trace( )—returns True if a trace has been created.
- get_units( )—returns the physical units of the signal if defined. Units of a signal are set using registry methods.
- set_trace(trace)—deposits signal trace in the signal trace array. For example,
- if not sig.has_trace( ): sig.set_trace(np.random.randint(2, size=registry.trlen))

Spectrum

Class Spectrum is the frequency spectrum of an analog signal. A signal spectrum at a sampling moment is calculated by applying fast Fourier transform (FFT) to the part of the signal, extracted by the sliding window and multiplied by the window function. Since all signals are real, the spectrum is symmetric about zero frequency. Amstaff keeps only a half of the spectrum corresponding to non-negative frequency bins, the number of Amstaff frequency bins is ceil(w/2) where w is the window size. Signal spectrum (amscheck.spectrum) can be manipulated as an array and can be involved in expressions with arrays of the same size. Each entry in the array corresponds to one frequency bin and is a complex number. The magnitude is the amplitude of the signal at the respective frequency and the angle is the phase.

Objects of spectrum class are created by using the _ams_checker.make_spectrum( ) method, where_ams_checker is the base class for all Amstaff checkers as explained below. The following methods of spectrum class are available:

- size( )—returns the spectrum size in bins. It is usually half the size of the sliding window. If the checker has the frequency limits set (ams_checker_options.frequency_lb and ams_checker_options.frequency_ub), then only bins within these limits are counted.
- const_component( )—returns the magnitude of the constant signal component in its default units. If the checker frequency limit ams_checker_options.frequency_lb is set to a positive value, then None is returned.
- bin_frequency(n)—returns the frequency corresponding to the n-th bin of the spectrum in default frequency units. For example, given spectrum X, X.bin_frequency(argmax(abs(X))) returns the main frequency of X.
- get_option(name)—returns the option name of the spectrum.
- get_option_quantity(name)—returns the value of the option name as physical quantity.
- get_option_units(name)—returns the unit of the option name.

If the spectrum does not have the option name defined, the respective value of the checker option of the same name is returned.

Class amscheck.spectrum_options—class containing option collection of a spectrum. These options are a subset of the checker options.

- set_option(**kwords)—sets spectrum option value. Setting spectrum option values is allowed only prior to calling checker method_ams_checker.check( ).
- is_main_bin(bin, rtol, atol)—returns true if frequency bin has maximal magnitude within the relative and absolute tolerances rtol and atol.
- is_main_frequency(freq, rtol, atol)—returns true if the bin closest to frequency freq has maximal magnitude given the relative and absolute tolerances rtol and atol.
- main_bin( )—returns the index of the bin with the maximal magnitude. If there are several such bins, the bin with the minimal index is returned. The 0-frequency component is not considered.
- main_frequency( )—returns the frequency corresponding to the bin with the maximal amplitude. If there are several such bins, the minimal frequency of these bins is returned. The 0-frequency component is not considered.

It is also possible to access frequency, amplitude and phase directly from the signal, for example:

- x.frequency( ), x.amplitude( ), x.phase( ) return arrays of these quantities for signal x. These quantities are computed from signal spectra. Therefore, they are only evaluated on each move of the sliding window and remain constant between the moves.

Checker Class

@amscheck.ams_checker decorator on a user defined class definition makes the user class a data class and makes it to inherit (directly or not) from class amscheck._ams_checker which is the base class of any Amstaff checker. For example, @ams_checker
class MyChecker: # This class is treated as an Amstaff checker The base class amscheck._ams_checker adds the following methods and members:

add_signal(name, trace, unit=None)—adds a signal to the registry. E.g., use in constructor
```
def _post init_(self):
    self.sum=self.add_signal(name='sum',
        unit=registry.units.V, trace=self.x+self.y)
```
amplitude(signal)—gets the amplitude of a signal as the sum of magnitudes of the main frequency bin and its immediate adjacent bins (zero frequency bin is not included), e.g., to compute the maximum amplitude in a signal trace use maxAmplitude=max(self.amplitude (sig)).

at_end( )—evaluates a user defined action at the end of checker evaluation. It is called after all computations on all window moves are completed and before temporal assertion evaluation. By default, it is void and may be redefined in a checker.

bin_frequency(n)—returns the frequency corresponding to the n-th bin of a spectrum.

check( )—runs the checker instance and all its assertions. For example,
```
@ams_checker
class MyChecker:
    x:signal
    y:signal
MyChecker checker(x, y)
checker. check ( )
```
get_checker_name( )—returns the checker name.

get_option(name)—returns the value of the checker option called name. If the checker does not have this option explicitly defined, its default value is returned (which could be None).

get_option_quantity(name)—returns the checker option called name as physical quantity (e.g., in V, A, etc.). If the checker does not have this option explicitly defined, its default value is returned (which could be None).

get_option_units(name)—returns the physical units of the option called name. The returned value could be None if the option is unitless or the option does not exist.

frequency(signal)—returns the frequency of the main bin of signal, computed on each sliding window move. For example,
freqRms=numpy.std(self.frequency(sig))

make_inflated_array(dtype=numpy.float)—returns an inflated array of type dtype (see Inflated Arrays below).

make_spectrum(signal, clock=None, upsample=None)—creates a new spectrum object for signal, optionally specifying a clock and whether it should be upsampled.

on_window_move( )—evaluates a user defined action on each move of the sliding window. It is called before the evaluation of window assertions and its intent is to perform actions common to several window assertions or to collect data for temporal assertions. By default, this function is void and it may be redefined in a checker definition. For example,
```
@ams_checker
class MyChecker:
    . . .
    def on_window_move (self):
        print('Moving sliding window')
```
phase(signal)—returns an array of phases of the main frequency of signal, computed on each move of the sliding window.

sample_at(wv, clock)—samples waveform wv at ticks of a clock. When clock is a Boolean array this function is equivalent to wv[clock].

set_name(name)—sets the name of the checker, to be used in Amstaff reports. For example,
```
@ams_checker
class MyChecker:
    . . .
checker=MyChecker( . . . )
checker.set_name ('My checker')
checker.check ( )
```
set_option(**kwords)—sets checker option defined by the keywords. For example,
```
@ams_checker
class MyChecker:
    x:signal
    y:signal
    def _post init_(self):
        self.X=self.make_spectrum(self.x)
        self.Y=self.make_spectrum(self.y)
        self.set_option(frequency_ub=2*registry.units.GHz)
```
Checker Options class amscheck.ams_checker_options encapsulates a collection of options of an Amstaff checker.

frequency_lb—Frequency lower limit. Bins that have a frequency lower than the option value are ignored in assertions.

frequency_ub—Frequency upper limit. Bins that have a frequency higher than the option value are ignored in assertions.

spectrum_size—Size of signal spectra in bins. Bins with frequencies outside the checker bandwidth as specified by frequency_lb and frequency_ub are not counted.

winfunc—Selects the window function for computing spectra.

winsize—Sliding window size in timesteps.

winstep—Number of timesteps the sliding window is advanced on each move.

Part 3. Assertions

Temporal Assertions

Temporal assertions verify the behavior of signal(s) in time. They are functions without arguments decorated with @assert_temporal. The functions return one of the following types:

1—An array which can be interpreted as Boolean array: Such assertion passes if all entries of the array are true, i.e., the assertion passes at each clock tick.

2—A tuple (Boolean array, Boolean array): The first array represents the status of the assertion and the second array defines the clock ticks. Positions marked with false in the status array correspond to assertion failures. The clock array is used to convert the failure positions to time. For example,
```
@assert_temporal
def GtAsrt (self):
    posedge=rising(self.clk)
    sx=self.x[posedge]
    sy=self.y[posedge]
    return sx>sy, posedge
```
3—Type returned by Amstaff validation functions, such as check_state_duration( ) and check_interval_duration( ). Their return value contains information about time instants when the assertion was violated. For example,
```
@assert_temporal
def VoltageViolation(self):
    return check_state_duration_lt(self.V>self.Vth, 5)
```
Boolean condition: In all other cases, the return expression must have a truth value. When it evaluates to true, the assertion passes, otherwise it fails. In this case there is no temporal information about the assertion failure. Such assertions are used for global checks that summarize a condition over the entire trace. For example, check the standard deviation between two signals:

@assert_temporal
def CheckStd(self):
return std(self.sig_ref-self.sig_out)<self.delta Temporal checks can be assertions, assumptions or covers. They are distinguished by the decorator of the function. An assertion checks that the behavior of the system is correct. For example, if a circuit is supposed to double the frequency of an incoming sine-wave but it does not, that is an assertion violation. An assumption checks that the environment of the system is correct. For example, if the input to a circuit is supposed to be a sine-wave but it is not, this is an assumption violation. Cover checks whether a certain situation is observable. For example, if it is desirable to observe whether some signal is greater than 0.5 V and this can actually be observed, then this scenario is covered. Most of this disclosure discusses assertion checks, but the principles described may also be applied to assumptions and covers.

@assert_temporal(**kwargs)—Temporal assertion decorator has up to two arguments:
msg(str)—user error message, and
severity(Severity)—the severity (represented as an enum type) of assertion failure, by default Severity.error. For example
@assert_temporal(msg='Large idle periods', severity=Severity.warning)
@assume_tempora(**kwargs)—Temporal assumption decorator. Parameters are the same as for @assert_temporal.
@cover_temporal(**kwargs)—Temporal coverage decorator. The only parameter is msg (str)-user message.

Window Assertions

Window assertions are checked on each move of the sliding window. Usually they are assertions in the frequency domain, but not always. They are functions without arguments decorated with @assert_window. There is one- or multiple-time instants associated with failures of these assertions, namely, the time instants corresponding to the beginning of the window when the assertion failed. All window assertions are decorated functions with no arguments, returning one of the following types:

1—An array which can be interpreted as Boolean array: Assertion passes if all the array entries are true (non-zero). This array has the same shape as spectrum. The false entries correspond to the frequencies within the bandwidth as defined by frequency_lb frequency_ub and for which the assertion is violated.
For example,
@assert_window
def CheckAmplification (self):
return isclose(100*abs(self.X), abs(self.Y), rtol=0.001)

2—Boolean condition: When the condition evaluates to true the assertion passes, otherwise it fails. Failures only indicate a problematic window as a whole, not a failure at a particular frequency. For example,
@assert_window
def CheckFrequency(self):
f=self.X.main_frequency( )
return isclose(f, self.fref)

As in the case of temporal checks, there are three decorators to distinguish assert, assume and cover statements, with similar arguments:

@assert_window(**kwargs)—Window assertion decorator.
@assume_window(**kwargs)—Window assumption decorator.
@cover_window(**kwargs)—Window coverage decorator.

Functional Assertions

Functional assertions check a relationship between input and output variables of a cross-domain functional dependency. They are decorated with @assert_func. These assertions do not have a cover form. The functions corresponding to functional assertions are explicitly called, and their first argument is the functional dependency to be checked. The result of the function is interpreted as true or false. The decorators are thus @assert_func(kwargs) and @assume_func(kwargs).

To define a functional dependency, first define the axes by instantiating an object of the appropriate class. There are the following predefined axes objects:

Linear axis fdep_lin_axis is defined by its start and stop values and step increment.
Octave axis fdep_oct_axis is defined by its start and stop values and a logarithmic increment in octaves.
Decimal axis fdep_dec_axis is defined by its start and stop values and a logarithmic increment in decades.
List axis fdep_list_axis is explicitly defined by listing all its values.

For the example shown in FIG. 6, the two axes would be defined as
Vdd=fdep_lin_axis('Vdd', 0.500, 0.725, 0.025)
T=fdep_lin_axis('T', −20, 120, 20)

The output variables are specified using a n-dimensional arrays corresponding to the shapes of the input axes and passing them to instances of class fdep_outvar. In the above example, the arrays Vout_data and Q_data are two-dimensional arrays of the shape (Vdd.size, T.size). The output variables are defined as
Vout=fdep_outvar('Vout', Vout_data)
Q=fdep_outvar('Q', Q_data)

The entire functional dependency is specified by instantiating fdependency object:
depend=fdependency([Vdd, T], [Vout, Q])

Amstaff provides functional assertions to check relations between inputs and outputs of a functional dependency. For example, given the functional dependency Y of X
yOfx=fdependency([X], [Y])
where X.name='X' and Y.name='Y', it is possible to check that Y depends linearly on X with the following assertion
@assert_func
def checkYofX(self, dep):
return isconst(dep.D('Y', 'X'))

It checks that the derivative is almost constant. DO is a functional dependency method to compute a derivative. In other words, Y is nearly linearly dependent on X. It may be called from within the checker as
self.checkYofX(yOfx)

If it is necessary to provide a profile of the derivative as function of X, it can be computed using
for proj in self.depend.sweep(axis=X):
self.checkYofX(proj)

Inflated Arrays

Inflated arrays are of the size of the trace (registry.trlen). The elements are evaluated from the sliding window data and kept constant between window moves. For example, if registry.trlen is 10, ams_checker_options.winsize is 4, and ams_checker_options.winstep is 3, then there are 3 positions of the sliding window: 0, 3 and 6. Assuming that at time 0 the value of 1.2 is assigned to inflated array a, at time 3 the value of 4.1, and at time 6 the value of 2.5, then the values of a are: [1.2, 1.2, 1.2, 4.1, 4.1, 4.1, 2.5, 2.5, 2.5, 2.5].
Inflated arrays can be used the same way as a regular arrays.
For example,

```
@ams_checker
class MyChecker:
    x: signal
    deltaLimit: real
    def post_init (self):
        self.X=self.make_spectrum(self.x)
        self.deltaLimit=deltaLimit
        self.ccomp=self.make_inflated_array( )
    def on_window_move (self): # add the 0-frequency
            component to the array
        self.ccomp.push_back(self.X.const_component( ))
    @assert_temporal
    def SmallChanges(self): # the component must be
            within limits at all times
    return diff(self.ccomp)<self.deltaLimit
```

The inflated array class amscheck.inflated_array has two predefined methods available to the user:

push_back(value)—writes value at the current position in the inflated array. That position corresponds to the current timestep of the time window. Each subsequent write at the same window position overrides the previous value, and it fills the gap between the value written at the previous window position and the current position with the value of the previous array position. If no value was written into the array prior to the current window position, the current value will be replicated backwards.

top( )—returns the value of the last written element by push_back(value) or None if still empty.

Time Limits

In the case that only a part of a trace should be considered as delimited by start and end times, Amstaff provides the following class to restrict operations on the trace to within the limits.

class amscheck.time_limits and its constructor _init_ (t_begin, t_end) is used to define the start and end limits. The clause with time_limits(start, end) restricts the subsequent operations to only a portion of the trace between times start and end. Arrays other than traces are not affected by this clause. For example, given a signal trace sig, the mean value of sig is computed only between the times start and end (possibly reduced by the actual size of the trace):

```
with time_limits (start, end):
    ave=mean (sig)
```

Part 4. Amstaff Library

This section describes a library of functions that may simplify writing checkers for analog signals. The use of the library is not required.

check_interval_duration(start, end, func, when=True): Check that interval duration meets the imposed constraints.
  start—Interval start condition, Boolean array.
  end—Interval end condition, Boolean array.
  func—callable function checking the constraint.
  when—Optional. Scalar or array, interpreted as Boolean. If when condition does not hold at some point of the interval, the entire interval is ignored.
  For example
    check_interval_duration(start=rose(req), end=rose (gnt), func=lambda d: d<=120)

check_interval_duration_eq(start, end, duration, rtol, atol, when=True): Check that the duration of selected intervals equals to the specified value. It is equivalent to
  check_interval_duration(start, end, lambda d: numpy.isclose(d, duration, rtol, atol), when)

Similar functions are check_interval_duration_gt( ), check_interval_duration_lt( ).

check_state_duration(cond, func, when=True): Check that the time duration during which a condition continuously holds meets the imposed constraints.
  cond—State condition as numpy array. The array size must match the size of signal trace.
  func—Callable function checking the constraint.
  when—Optional. Scalar or array, interpreted as Boolean. If when condition does not hold at some point of the interval, the entire interval is ignored.
  Example: Check that V exceeds 0.2 no longer than during 5 ps.
    check_state_duration(cond=V>0.2, func=lambda d: d<=5)

check_state_duration_eq(cond, duration, rtol, atol, when=True): Check that the time duration during which a condition continuously holds equals to specified value. This function is equivalent to
  check_state_duration(cond, lambda d: numpy.isclose(d, duration, rtol, atol), when)

Similar functions are check_state_duration_gt( ), check_state_duration_lt( ).

periodic_waveform(prefix_duration, prefix_ranges, prefix_funcs, period_duration, period_ranges, pefiod_funcs, *args, **kw): Defines a periodic waveform to be used in checkers or testbenches. A periodic waveform consists of a prefix and periodic parts. Its periodic part repeats forever until the end of the trace.
  prefix_duration—Duration of the prefix part of the waveform. Should be 0 if the waveform is purely periodic.
  prefix_ranges— Sequence of time intervals of the prefix part of the waveform. The first interval lasts from 0 until prefix_duration[0]-1, the second one from prefix_time[0] until prefix_duration[0]+prefix_duration[1]-1, etc. The duration of the last range is derived from the other data.
  prefix_funcs— Sequence of scalars, pairs (tuples) or callable functions. Each element corresponds to the time interval defined by the prefix time instants. The number of elements is equal to the number of ranges.
  period_duration— Duration of the waveform period.
  period_ranges— Sequence of time intervals of the periodic part of the waveform. The first interval lasts from 0 until period_duration[0]-1, the second one from prefix times[0] until period_duration[0]+period_duration [1]-1, etc.
  period_funcs— Sequence of scalars, pairs (tuples) or callable functions. Each element or scalar corresponds to the time interval defined by the period time instants. The number of callables/scalars is equal to the number of ranges+1 (the interval from the last time instant until the end of the period). The duration of the last range is not specified as it can be derived from the other data.
  args— Optional list tuples of positional arguments to be passed to the callable functions.
  kw— Optional keyword arguments to be passed to the callables.
  Returns numpy.ndarray corresponding to the periodic waveform.

pw_waveform(instants, funclist, *args, **kw): Create a piecewise waveform.
  instants— Sequence of time instants dividing the time into intervals. The first interval lasts from 0 to instants [0]-1, the second one from instants[0] until instants[1]-1, etc. The last interval lasts from the last provided instant until the end of the trace.

funcs— Sequence of scalars, tuples (pairs) or callable functions. Each element corresponds to the time interval defined by the time instants. The scalar elements correspond to the constant functions on a range. The pair elements correspond to a linear function on a range built from their start and end values.

args— Optional list of positional arguments to be passed to the callables.

kw— Optional keyword arguments to be passed to the callables.

Returns numpy.ndarray corresponding to the piecewise waveform.

pw_waveform2(funclist, step, start, *args, **kw): Create a piecewise waveform. Given a set of conditions and corresponding functions, evaluate each function in the time interval(s) where its condition in true. The function is similar to pw_waveform( ) but the time instants are given by the start and the time increment step.

always_after(arr, n): Mark where array arr evaluates to True in at least n locations, starting from and including the current one. It returns a Boolean array with corresponding entries set to True.

always_before(arr, n): Mark where arr is True in at least n positions, ending at and including the current one. It returns a Boolean array with corresponding entries set to True.

array_skews(a, b, n): Compute skews between two arrays. Each n-th non-zero position in the first array is compared with the corresponding non-zero position in the second array. Each such comparison results in a skew: the difference between the corresponding indexes. If there is no corresponding non-zero position in the second array, then the non-zero position in the first array is ignored. It returns an array of skews.

changed(a, rtol, atol): Returns a Boolean array marking positions where a changed value outside the tolerances rtol and atol.

changing(a, rtol, atol): Returns a Boolean array marking positions where a is changing.

eventually_after(arr, n): Returns a Boolean array marking positions where arr is True at least at one of n positions, starting from and including the current one.

eventually_before(arr, n): Returns a Boolean array marking positions where arr is True at least at one of n positions, ending at and including the current one.

falling(a): Returns a Boolean array marking positions where a is decreasing.

rising(a): Returns a Boolean array marking positions where a is increasing.

steady(a): Returns a Boolean array marking positions where a is remaining stable.

fell(a): Returns a Boolean array marking positions where a has decreased.

rose(a): Returns a Boolean array marking positions where a has increased.

stable(a, rtol, atol): Returns a Boolean array marking positions where a remains stable within the tolerances.

implies(x1, x2): Returns a Boolean array representing the result of elementwise implication x1→x2. Parameters x1 and x2 have to be of the same shape. The function is equivalent to numpy.logical_or(numpy.logical_not(x1), x2).

interval_lengths(start, end): Returns an array of lengths of intervals delimited by start and end arrays of events.

isconst(a, rtol, atol): Checks whether array values are constant within a given tolerance. It is a shortcut for numpy.isclose(a, numpy.mean(a), rtol, atol).

issmall(a, rtol, atol): Checks whether the absolute values of array elements are close to 0. It is a shortcut for numpy.isclose(a, 0, rtol, atol).

percentage(a, n): Computes percentage level of an array, i.e., min(a)+(max(a)−min(a))*n/100.

pp(a, n): Computes point-to-point value distance in the array. The function is a shortcut for numpy.amax(a)-numpy.amin(a).

reduce_and(*a): Performs element-wise logical AND on function parameters. E.g., reduce_and(x, y, z) is equivalent to numpy.logical_and(numpy.logical_and(x, y), z))

reduce_or(*a): Performs element-wise logical OR on function parameters. E.g., reduce_or(x, y, z) is equivalent to numpy.logical_or(numpy.logical_or(x, y), z)).

has_pattern(signal, pattern): Checks if the signal contains a pattern. The signal s contains pattern p iff s may be obtained as a subsequence of the sequence generated by repeating p.

runs_lengths(signal): Returns an array of the lengths of contiguous true values in signal.

state_lengths(cond): Returns an array of lengths of intervals during which condition holds continuously.

Part 5. EDA Systems

Figure 7:
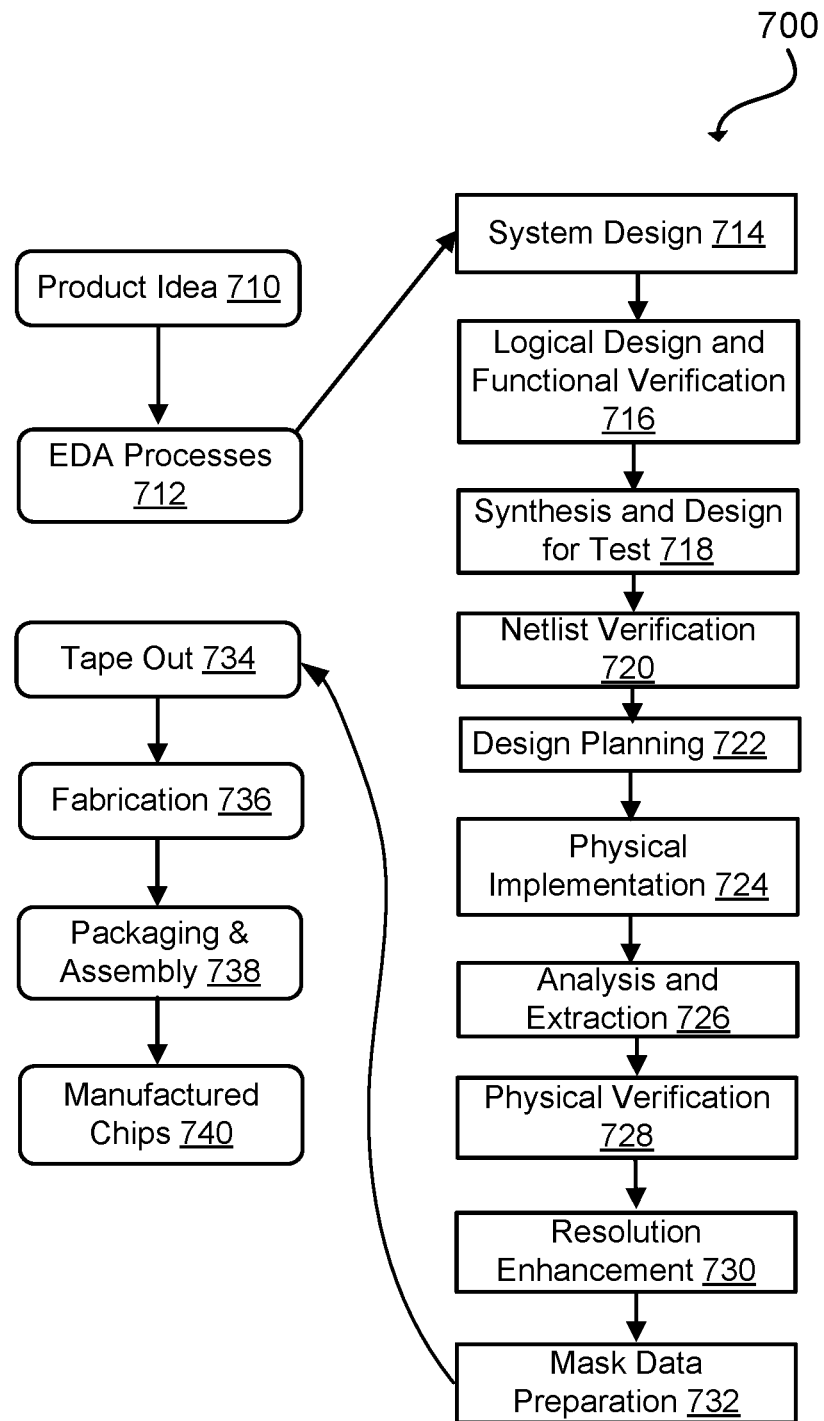
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits8

A storage subsystem of a computer system (such as computer system 900 of FIG. 8) may be used to store the programs and data structures that are used by some or all of the EDA products described herein, and products used for development of cells for the library and for physical and logical design that use the library.

Figure 8:
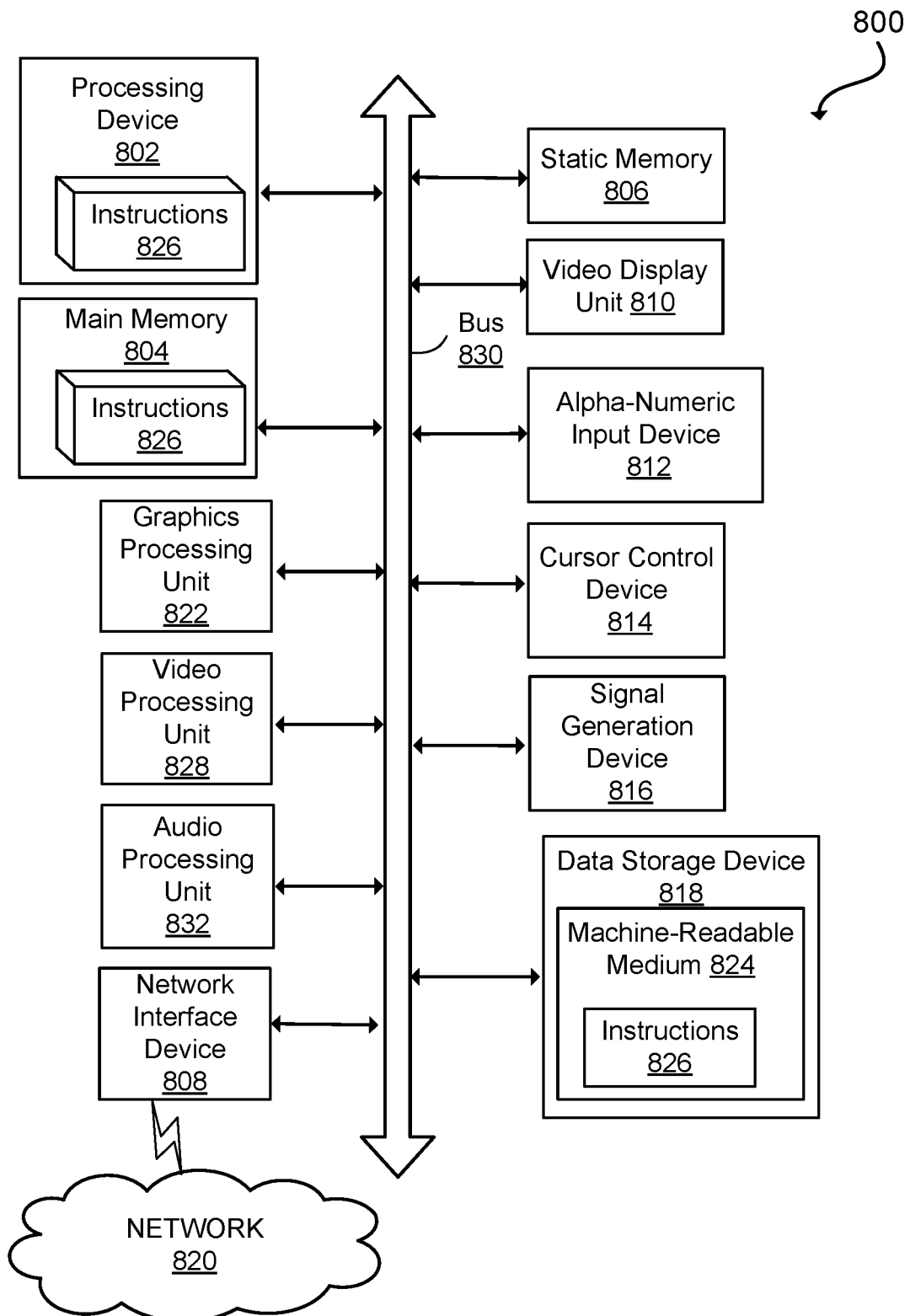
FIG. 8 depicts an abstract diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    accessing a predicted behavior of an analog signal in an analog mixed-signal (AMS) circuit;
    accessing an assertion for verifying behavior of the analog signal in the AMS circuit, the assertion expressed in an assertion language that supports assertions for AMS circuits; wherein the assertion language includes at least one of (a) predefined classes for assertions for analog signals in a temporal domain, and the predefined classes include assertions based on relations between analog signals in the AMS circuit, assertions for dependencies of analog signals on time, and assertions for integral characteristics of analog signals; (b) predefined classes for assertions for analog signals in a frequency domain; and (c) predefined classes for assertions for cross-domain functional dependencies of analog signals; and
    verifying, by a processor device, the assertion against the predicted behavior of the analog signal in the AMS circuit.

2. The method of claim 1 wherein the assertion language includes predefined classes for assertions for analog signals in the temporal domain, and the predefined classes include assertions based on relations between analog signals in the AMS circuit, assertions for dependencies of analog signals on time, and assertions for integral characteristics of analog signals.

3. The method of claim 1 wherein the assertion language includes predefined classes for assertions for values of analog signals collected on sliding window moves.

4. The method of claim 3 wherein failure of the assertion returns locations of the windows for which the assertion failed.

5. The method of claim 1 wherein the assertion language includes predefined classes for assertions for analog signals in the frequency domain.

6. The method of claim 5 wherein failure of the assertion returns frequencies at which the assertion failed.

7. The method of claim 1 wherein the assertion language includes predefined classes for assertions for cross-domain functional dependencies of analog signals.

8. The method of claim 7 wherein failure of the assertion returns values of the analog signal for which the assertion failed.

9. The method of claim 1 wherein the predicted behavior of the analog signal is stored and manipulated as an array.

10. The method of claim 9 wherein verifying the assertion returns an array indicative of whether the assertion failed.

11. The method of claim 9 wherein the array represents samples of the predicted behavior of the analog signal taken according to a common time base.

12. The method of claim 1 wherein the assertion language supports mathematical relations using complex numbers.

13. A system comprising:
a memory storing instructions; and
a processor device, coupled with the memory and to execute the instructions, the instructions when executed cause the processor device to:
read a design of an AMS circuit; and predict a behavior of an analog signal in the AMS circuit; and
read an assertion for verifying behavior of the analog signal in the AMS circuit, the assertion expressed in an assertion language for AMS circuits that supports mathematical relations using real numbers; wherein the assertion language includes predefined classes for assertions for analog signals in a temporal domain, for analog signals in a frequency domain, and for cross-domain functional dependencies of analog signals; and
verify the assertion for the analog signal against the predicted behavior of the analog signal.

14. The system of claim 13 wherein the design of the AMS circuit is a transistor-level design, and the instructions that predict a behavior of an analog signal in the AMS circuit comprise a circuit-level simulator.

15. The system of claim 13 wherein the design of the AMS circuit is a real number model of the AMS circuit, and the instructions that predict a behavior of an analog signal in the AMS circuit comprise a simulator or emulator of the real number model.

16. The system of claim 13 wherein the instructions that predict a behavior of an analog signal in the AMS circuit and the instructions that verify the assertion for the analog signal are integrated into a single set of instructions.

17. The system of claim 13 wherein the predefined classes for assertions for analog signals in a temporal domain comprise assertions based on relations between analog signals in the AMS circuit, assertions for dependencies of analog signals on time, and assertions for integral characteristics of analog signals.

18. The system of claim 13 wherein the assertion language supports mathematical relations using complex numbers.

19. A non-transitory computer readable medium comprising stored instructions, which when executed by a processor device, cause the processor device to:
access a predicted behavior of an analog signal in an analog mixed-signal (AMS) circuit;
access an assertion for verifying behavior of an analog signal in the AMS circuit, the assertion expressed in an assertion language for AMS circuits; and
verify the assertion against the predicted behavior of the analog signal in the AMS circuit;
the non-transitory computer readable medium further comprising a stored library containing predefined functions for manipulation of analog signals in a temporal domain, of analog signals in a frequency domain, and conversion between the temporal and frequency domains.

20. The non-transitory computer readable medium of claim 19 further comprising stored predefined classes for assertions for analog signals in a temporal domain, for analog signals in a frequency domain, and for cross-domain functional dependencies of analog signals.

* * * * *